(12) United States Patent
Beason et al.

(10) Patent No.: US 11,873,945 B2
(45) Date of Patent: *Jan. 16, 2024

(54) DELIVERING AND METERING GREASE TO PROCESS VALVES

(71) Applicant: Downing Wellhead Equipment, LLC, Oklahoma City, OK (US)

(72) Inventors: Ronnie B. Beason, Lexington, OK (US); Nicholas J. Cannon, Washington, OK (US)

(73) Assignee: DOWNING WELLHEAD EQUIPMENT, LLC, Oklahoma City, OK (US)

( * ) Notice: Subject to any disclaimer, the term of this patent is extended or adjusted under 35 U.S.C. 154(b) by 465 days.

This patent is subject to a terminal disclaimer.

(21) Appl. No.: 16/938,341

(22) Filed: Jul. 24, 2020

(65) Prior Publication Data

US 2020/0355322 A1    Nov. 12, 2020

Related U.S. Application Data

(63) Continuation of application No. 16/248,648, filed on Jan. 15, 2019, now Pat. No. 10,724,682.

(Continued)

(51) Int. Cl.
  *F16N 29/02*    (2006.01)
  *F16N 13/16*    (2006.01)
  *F16N 13/20*    (2006.01)

(52) U.S. Cl.
  CPC ............ *F16N 29/02* (2013.01); *F16N 13/16* (2013.01); *F16N 13/20* (2013.01); *F16N 2250/16* (2013.01); *F16N 2270/20* (2013.01)

(58) Field of Classification Search
  CPC .......... F16N 29/02; F16N 13/16; F16N 13/20; F16N 2250/16; F16N 2270/20
  See application file for complete search history.

(56) References Cited

U.S. PATENT DOCUMENTS 5,285,871 A * 2/1994 Sievenpiper ............ F16N 11/10
                                                        184/29
7,367,428 B2 * 5/2008 Schmidt .................. F16N 25/02
                                                        184/7.4

(Continued)

*Primary Examiner* — Michael R Mansen
*Assistant Examiner* — Mark K Buse
(74) *Attorney, Agent, or Firm* — HAYNES AND BOONE, LLP

(57) ABSTRACT

System, apparatus, and method for delivering grease to process valve(s). The system generally includes a grease cylinder to which grease is delivered, a piston, an actuator, and a first process valve. The piston extends at least partially within the grease cylinder. The actuator strokes the piston within the grease cylinder to meter a first amount of the delivered grease to the first process valve. The actuator comprises a power cylinder within which the piston extends. The piston comprises a head portion slidably disposed in the power cylinder and dividing the power cylinder into first and second chambers. The head portion has a first cross-sectional area. The piston includes another portion contacting the grease in the grease cylinder and having a second cross-sectional area smaller than the first cross-sectional area. The actuator may also meter a second amount of the delivered grease to a second process valve.

20 Claims, 4 Drawing Sheets

Related U.S. Application Data

(60) Provisional application No. 62/617,443, filed on Jan. 15, 2018.

(56) References Cited

U.S. PATENT DOCUMENTS

| | | | | |
|---|---|---|---|---|
| 2012/0247876 A1* | 10/2012 | Kreutzkamper | ........ | F16N 7/385 |
| | | | | 184/14 |
| 2013/0277148 A1* | 10/2013 | Beck | ........ | F16N 29/02 |
| | | | | 184/7.4 |
| 2017/0038003 A1* | 2/2017 | Conley | ........ | F16N 7/385 |

* cited by examiner

DELIVERING AND METERING GREASE TO PROCESS VALVES

CROSS-REFERENCE TO RELATED APPLICATIONS

This application is a continuation of U.S. application Ser. No. 16/248,648 (the "'648 application"), filed Jan. 15, 2019, the entire disclosure of which is hereby incorporated herein by reference.

The '648 application claims the benefit of the filing date of, and priority to, U.S. Application No. 62/617,443, filed Jan. 15, 2018, the entire disclosure of which is hereby incorporated herein by reference.

TECHNICAL FIELD

The present disclosure relates generally to grease injection and, more particularly, to an apparatus, system, and method for delivering and metering grease to process valves used in, for example, oil and gas operations.

BACKGROUND

Certain valves used in, for example, oil and gas operations encounter debris and contaminants, which can severely impair the performance of these valves. To address this issue, specific amounts of grease must be injected into the valves to flush the debris and contaminants. Currently, to inject appropriate amounts of grease into such valves, an operator manually connects a pump to the valves one at a time and pumps grease to each valve for a predetermined amount of time. In some cases, since this process is inherently inexact, operators will pump for extra time to ensure that an adequate amount of grease is pumped into each valve. In other cases, a less than adequate amount of grease is pumped into each valve, increasing the risk of malfunction and maintenance needs. Accordingly, an apparatus, system, or method capable of injecting grease into numerous valves and monitoring the amount of grease injected into each valve would be desirable. Therefore, what is needed is an apparatus, system, or method that addresses one or more of the foregoing issues and/or one or more other issues.

DETAILED DESCRIPTION

Figure 1:
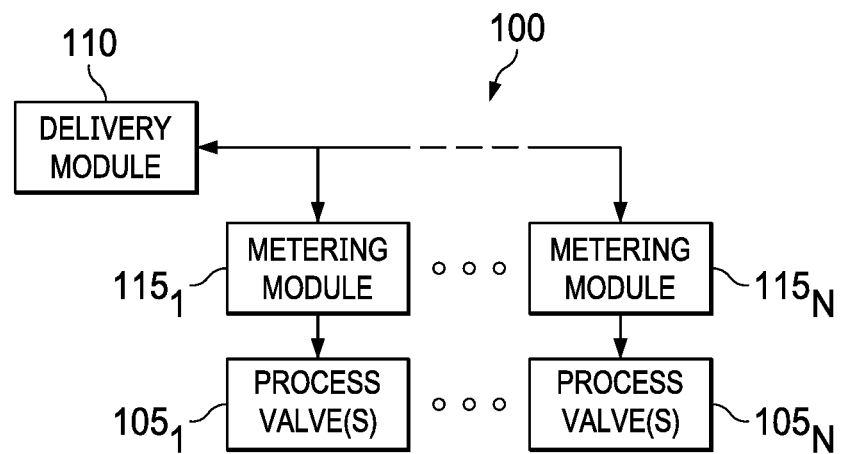
FIG. 1 is a diagrammatic illustration of a system for lubricating process valves, the system including a delivery module and metering modules, according to one or more embodiments of the present disclosure.

Referring to FIG. 1, in an embodiment, a system for delivering and metering grease to process valves $105_{1-N}$ used in oil and gas operations is diagrammatically illustrated and generally referred to by the reference numeral 100. For example, the process valves $105_{1-N}$ may be part of an oil and gas wellbore fracturing system. In some embodiments, the process valves $105_{1-N}$ are gate valves. The system 100 includes a delivery module 110 and metering modules $115_{1-N}$. The metering modules $115_{1-N}$ are each operably associated with, and adapted to be in communication with, the delivery module 110. Likewise, the process valves $105_{1-N}$ are operably associated with, and adapted to be in communication with, the metering modules $115_{1-N}$, respectively. In operation, to grease the process valves $105_{1-N}$, the metering modules $115_{1-N}$ are adapted to force grease from the delivery module 110 into the respective process valves $105_{1-N}$.

Figure 2:
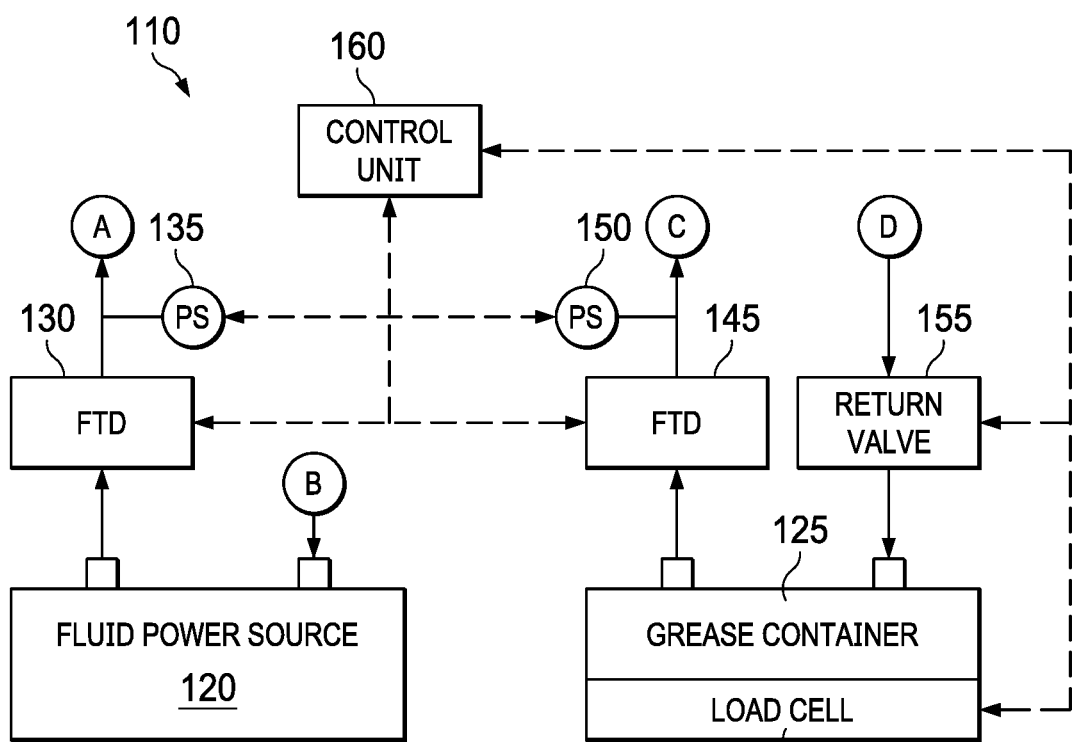
FIG. 2 is a diagrammatic illustration of the delivery module of FIG. 1, according to one or more embodiments of the present disclosure.

Referring to FIG. 2 with continuing reference to FIG. 1, in an embodiment, the delivery module 110 includes a fluid power source 120 and a grease container 125. The fluid power source 120 stores a power fluid for forcing grease from the grease container 125 into the process valves $105_{1-N}$, as will be described in further detail below. A fluid transport device 130 is operably associated with the fluid power source 120. The fluid transport device 130 can be a pump or a compressor, depending on the nature of the power fluid being used. In addition, or instead, the fluid transport device 130 may be or include a hydraulic power unit ("HPU") accumulator. In any case, the fluid transport device 130 is adapted to transport the power fluid from the fluid power source 120 to the metering modules $115_{1-N}$. A pressure sensor 135 is operably associated with the fluid transport device 130. The pressure sensor 135 is adapted to detect the pressure of the power fluid discharged from the fluid transport device 130. In addition to providing the power fluid transported to the metering modules $115_{1-N}$, the fluid power source 120 is also adapted to receive recycled power fluid from the metering modules $115_{1-N}$.

The grease container 125 stores grease. A grease measuring device 140 such as, for example, a load cell (e.g., a scale) is operably associated with the grease container 125. The grease measuring device 140 may be adapted to measure a mass of the grease container 125 to keep track of the amount of grease that has been used and how much is remaining. However, although described herein as a load cell, the grease measuring device 140 may be any suitable device capable of monitoring the amount of grease in the grease container 125 such as, for example, a ranging device, a linear position transducer, an optical/laser device, or the like that measures a level of the grease within the grease container 125. A fluid transport device 145 is operably associated with the grease container 125. The fluid transport device 145 can be a pump or a compressor, depending on the nature of the power fluid being used. In addition, or instead, the fluid transport device 145 may be or include a hydraulic power unit ("HPU") accumulator. In any case, the fluid transport device 145 is adapted to transport grease from the grease container 125 to the metering modules $115_{1-N}$. A pressure sensor 150 is operably associated with the fluid transport device 145. The pressure sensor 150 is adapted to detect the pressure of the grease discharged from the fluid transport device 145. In addition to providing the grease transported to the metering modules $115_{1-N}$, the grease container 125 is also adapted to receive recycled grease from the metering modules $115_{1-N}$. To this end, a return valve 155 is operably associated with the grease container 125 and adapted to selectively permit communication of the recycled grease from the metering modules $115_{1-N}$ to the grease container 125.

In some embodiments, as in FIG. 2, the system 100 also includes a control unit 160. The control unit 160 is adapted to send control signals to the fluid transport devices 130 and 145 and the return valve 155. In addition, the control unit 160 may receive operating speed data from the fluid transport devices 130 and 145 and/or valve position data from the return valve 155. The control unit 160 is also adapted to receive data/readings from the pressure sensors 135 and 150 (e.g., pressure data) and the grease measuring device 140 (e.g., grease measurement data).

Figure 3:
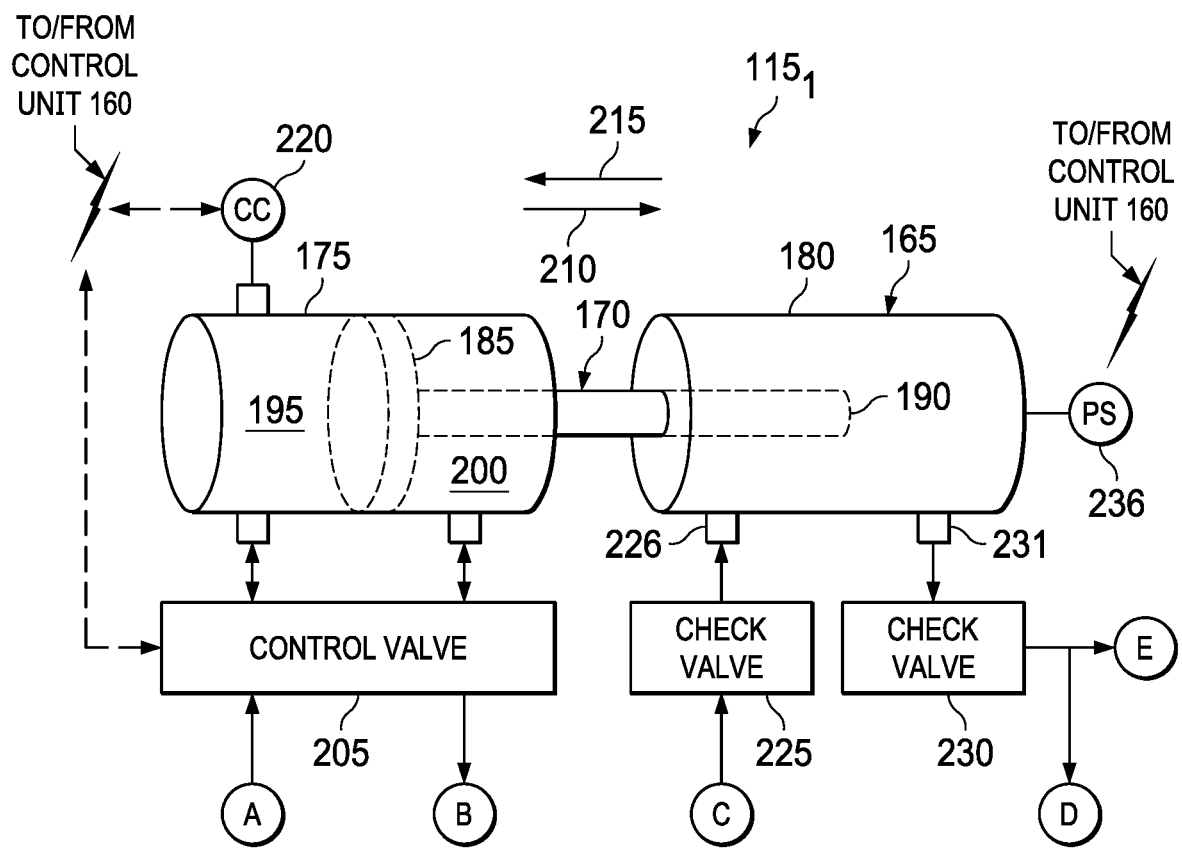
FIG. 3 is a diagrammatic illustration of a first embodiment of one of the metering modules of FIG. 1, according to one or more embodiments of the present disclosure.

In some embodiments, the metering modules $115_{1-N}$ are substantially identical to each other and, therefore, in connection with FIG. 3, only the metering module $115_1$ will be described in detail below; however, the description below also applies to the metering modules $115_{2-N}$. Referring to FIG. 3 with continuing reference to FIGS. 1 and 2, in an embodiment, to meter the amount of grease sent to a particular one of the process valves $105_1$, the metering module $115_1$ includes a grease metering device 165 such as, for example, a grease pump. In some embodiments, as in FIG. 3, the grease metering device 165 includes a piston 170, a power cylinder 175, and a grease cylinder 180.

The piston 170 includes a head portion 185 and a rod portion 190. The head portion 185 is slidably disposed in the power cylinder 175 and divides the power cylinder 175 into chambers 195 and 200. The rod portion 190 extends from the head portion 185 into the grease cylinder 180 so that, as the head portion 185 travels back and forth in the power cylinder 175, the rod portion 190 extends at least partially into, and retracts at least partially out of, the grease cylinder 180. The piston 170 may be displaced within the power cylinder 175 via hydraulic or pneumatic power; thus, in some embodiments, the power fluid stored by the fluid power source 120 is hydraulic or pneumatic. In addition, or instead, electric or gas power may be utilized to displace the piston 170.

In some embodiments, as in FIG. 3, a control valve 205 is operably associated with the power cylinder 175. The control valve 205 is adapted to receive the power fluid from the fluid transport device 130. To stroke the piston 170 in a direction 210, the control valve 205 is adapted to communicate power fluid from the fluid transport device 130 to the chamber 195 and, at the same time, to communicate power fluid from the chamber 200 back to the fluid power source 120. Similarly, to stroke the piston 170 in a direction 215, which is opposite the direction 210, the control valve 205 is adapted to communicate power fluid from the fluid transport device 130 to the chamber 200 and, at the same time, to communicate power fluid received from the chamber 195 back to the fluid power source 120. In addition, the pressure of the grease within the grease cylinder 180 forces the piston 170 in the direction 215. In some embodiments, the force exerted on the piston 170 by the grease within the grease cylinder 180 is sufficient by itself to stroke the piston 170 in the direction 215. Accordingly, to ensure that the grease cylinder 180 is filled with grease before being stroked in the direction 210, the force exerted on the piston 170 by the grease within the grease cylinder 180 may itself be relied on to stroke the piston 170 in the direction 215. In some embodiments, the fluid power source 120, the fluid transport device 130, the pressure sensor 135, the power cylinder 175, the control valve 205, or any combination thereof, may collectively be referred to herein as an "actuator" (i.e., hydraulic- or pneumatic-powered) for stroking the piston 170 back and forth within the grease cylinder 180. However, in addition, or instead, another "actuator" may also be used to stroke the piston 170 back and forth within the grease cylinder 180 such as, for example, an electric- or gas-powered actuator.

A cycle counter 220 is operably associated with the power cylinder 175. The cycle counter 220 may be or include limit switch(es) or other sensor(s) operably associated with the actuator to give analog or other linear position feedback. In any case, the cycle counter 220 is adapted to count the strokes of the piston 170 within the power cylinder 175. In some embodiments, the cycle counter 220 is capable of detecting partial strokes of the piston 170 to further enable precise greasing of the process valves $105_1$. As a result, if so desired, the system 100 is capable of partially greasing the process valves $105_1$ by allowing an operator to enter the "desired percentage" of grease required. In some embodiments, as in FIG. 3, the control unit 160 is adapted to send control signals to the control valve 205. In addition, the control unit 160 may receive valve position data from the control valve 205. The control unit 160 is also adapted to receive data/readings (e.g., stroke count data) from the cycle counter 220.

A check valve 225 is operably associated with an inlet 226 of the grease cylinder 180 and is adapted to communicate grease from the fluid transport device 145 to the grease cylinder 180 while preventing, or at least reducing, any backflow of the grease through the check valve 225. As a result, when the piston 170 is stroked in the direction 215, the rod portion 190 is retracted at least partially out of the grease cylinder 180 and the check valve 225 permits grease to be drawn into the grease cylinder 180 via the inlet 226. At the same time, a check valve 230 prevents grease from being drawn into the grease cylinder 180 via an outlet 231. The check valve 230 is operably associated with the outlet 231 of the grease cylinder 180 and is adapted to communicate grease from the grease cylinder 180 to the process valves $105_1$ while preventing, or at least reducing, any backflow of the grease through the check valve 230. As a result, when the piston 170 is stroked in the direction 210, the rod portion 190 is extended at least partially into the grease cylinder 180 and the check valve 230 permits grease to be forced out of the grease cylinder 180 via the outlet 231. At the same time, the check valve 225 prevents grease from being forced out of the grease cylinder 180 via the inlet 226. In some embodiments, the check valve 230 is biased to the closed position with more force (e.g., tighter springs) than that of the check valve 225 in order to maintain the pressure of the grease within the grease cylinder 180. For example, springs in the check valve 230 can be tuned to a desired cracking pressure (e.g., about 1000 psi) to determine the pressure of the grease within the grease cylinder 180.

In some embodiments, the grease metering device 165 is "double-acting" and includes a second grease cylinder substantially identical to the grease cylinder 180 and a second rod portion substantially identical to the rod portion 190; the second rod portion extends from the head portion 185 into the second grease cylinder so that, as the head portion 185 travels back and forth in the power cylinder 175, the second rod portion extends at least partially into, and retracts at least partially out of, the second grease cylinder.

Figure 4:
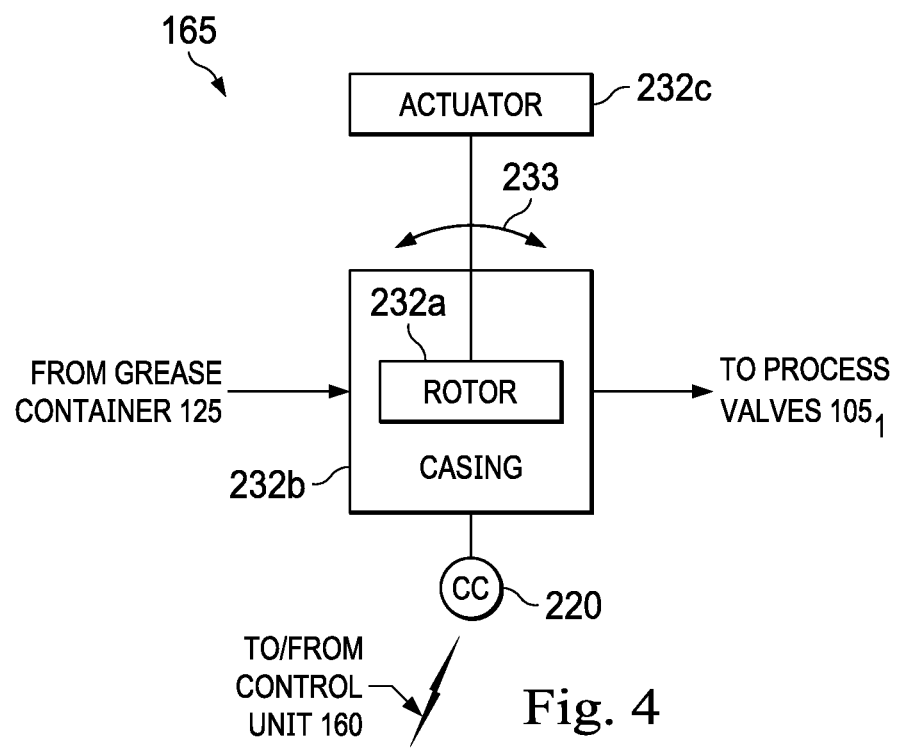
FIG. 4 is a diagrammatic illustration of a second embodiment of at least a portion of one of the metering modules of FIG. 1, according to one or more embodiments of the present disclosure.

Turning to FIG. 4, in an alternative embodiment, the grease metering device 165 is or includes a rotary pump having one or more rotors 232a adapted to be rotated within a casing 232b by an actuator 232c, as indicated by arrow 233 to drive the grease to the process valves $105_1$; in such embodiments, the cycle counter 220 is adapted to count revolutions of the rotor(s) rather than strokes of the piston 170.

Figure 5:
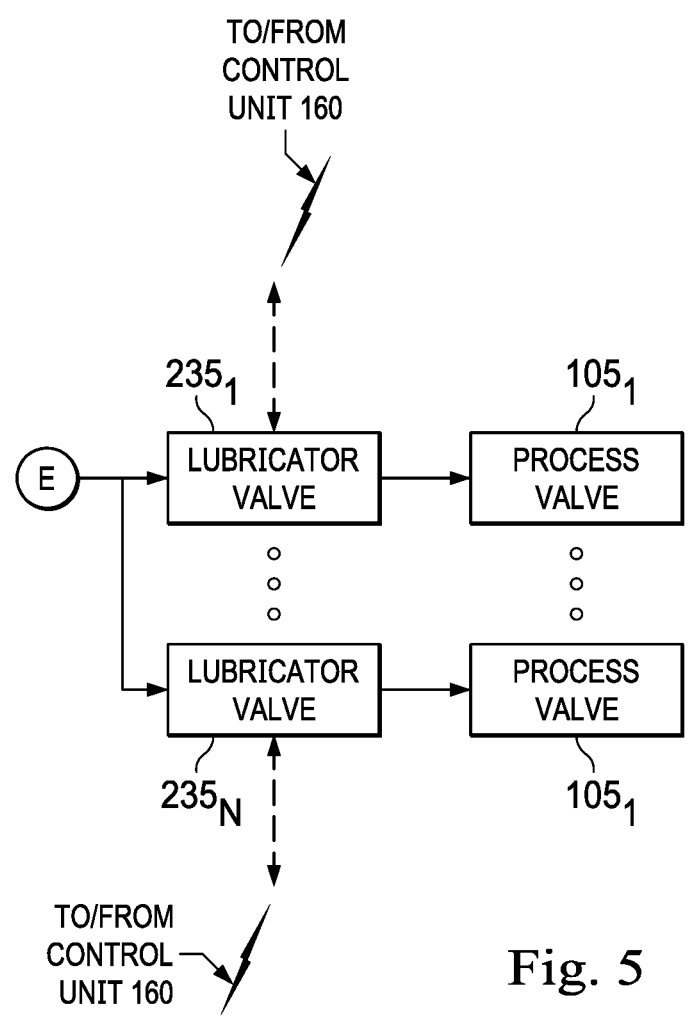
FIG. 5 is a diagrammatic illustration of lubricator valves operably associated with at least some of the process valves of FIG. 1, according to one or more embodiments of the present disclosure.

Referring to FIG. 5 with continuing reference to FIGS. 1-4, in an embodiment, the process valves $105_1$ are adapted to be in communication with the metering module $115_1$ via lubricator valves $235_{1-N}$. In some embodiments, the lubricator valves $235_{1-N}$ are part of the metering module $115_1$. Similarly, the process valves $105_{2-N}$ may be adapted to be in communication with the metering modules $115_{2-N}$, respectively, via lubricator valve(s) substantially identical to the lubricator valves $235_{1-N}$. The lubricator valves $235_{1-N}$ are adapted to selectively communicate grease from the grease cylinder 180 to respective ones of the process valves $105_1$. In some embodiments, as in FIG. 5, the control unit 160 is adapted to send control signals to the lubricator valves $235_{1-N}$. In addition, the control unit 160 may receive valve position data from the lubricator valves $235_{1-N}$.

Alternatively, in some embodiments, the grease metering devices 165 may be omitted and replaced with flow meters that are operably associated with respective ones of the process valves $105_1$ (and thus respective ones of the lubricator valves $235_{1-N}$; in such embodiments, the control unit 160 receives feedback from the flow meters and actuates the lubricator valves $235_{1-N}$ to meter a desired amount of grease to the process valves $105_1$ using the fluid transport device 145. In some embodiments, the system 100 further includes one or more pressure sensors located downstream from the check valve 230 (e.g., to monitor pressure within the process valves $105_1$); as a result, using data/readings obtained from these one or more pressure sensors, the control unit 160 can ensure that the greasing pressure is greater than the pressure within the process valves $105_1$. Additional valves may also be added downstream from the check valve 230 to provide double barriers to prevent, or at least reduce, any leakage of process fluid from the process valve.

Referring collectively to FIGS. 1-5, in operation, the fluid transport device 130 transports power fluid from the fluid power source 120 to the control valve 205 of the metering module $115_1$. During the transporting of the power fluid to the control valve 205, the control unit 160 communicates control signals to the fluid transport device 130 and receives data/readings from the pressure sensor 135. As a result, the control unit 160 can adjust the flow of the power fluid to the control valve 205 using the fluid transport device 130 and monitor the pressure of the power fluid exiting the fluid transport device 130 using the pressure sensor 135. The control valve 205 actuates the piston 170 within the power cylinder 175. To actuate the piston 170 in the direction 210 within the power cylinder 175, the control valve 205 communicates power fluid from the 130 to the chamber 195 and, at the same time, communicates power fluid from the chamber 200 back to the fluid power source 120. Conversely, to actuate the piston 170 in the direction 215 within the power cylinder 175, the control valve 205 communicates power fluid from the fluid transport device 130 to the chamber 200 and, at the same time, communicates power fluid from the chamber 195 back to the fluid power source 120. During the actuation of the piston 170 within the power cylinder 175, the control unit 160 communicates control signals to the control valve 205 and receives data/readings from the cycle counter 220. As a result, the control unit 160 can stroke the piston 170 back and forth within the power cylinder 175 using the control valve 205 and count the strokes of the piston 170 back and forth within the power cylinder 175 using the cycle counter 220. In other embodiments, in addition, or instead, electric or gas power may be utilized to actuate the piston 170.

The fluid transport device 145 transports grease from the grease container 125 to the inlet 226 of the grease cylinder 180. During the transporting of the grease to the grease cylinder 180, the control unit 160 communicates control signals to the fluid transport device 145 and receives data/readings from the pressure sensor 150. As a result, the control unit 160 can adjust the flow of the grease to the grease cylinder 180 using the fluid transport device 145 and monitor the pressure of the grease exiting the fluid transport device 145 using the pressure sensor 150. As the piston 170 is actuated in the direction 215, the grease is drawn into the grease cylinder 180 through the inlet 226. The transporting of the grease to the grease cylinder 180 using the fluid transport device 145 allows the grease to be more efficiently and completely drawn into the grease cylinder 180 through the inlet 226 as the piston 170 is actuated in the direction 215. Conversely, as the piston 170 is actuated in the direction 210, the grease is forced out of the grease cylinder 180 through the outlet 231. The lubricator valves $235_{1-N}$ selectively communicate the grease forced out of the grease cylinder 180 to respective ones of the process valves $105_1$. In addition, the return valve 155 selectively communicates the grease forced out of the grease cylinder 180 back to the grease container 125.

The control unit 160 communicates control signals to the return valve 155 and the lubricator valves $235_{1-N}$. As a result, the control unit 160 can selectively actuate the return valve 155 and the lubricator valves $235_{1-N}$ to determine: whether the grease forced out of the grease cylinder 180 is communicated back to the grease container 125; and/or which of the process valves $105_1$ receives the grease forced out of the grease cylinder 180. For example, if the control unit 160 closes the return valve 155, opens one of the lubricator valves $235_{1-N}$, and closes the remaining lubricator valves $235_{1-N}$, the grease forced out of the grease cylinder 180 will be communicated to the process valve $105_1$ that is operably associated with the opened one of the lubricator valves $235_{1-N}$. For another example, if the control unit 160 opens the return valve 155 and closes the lubricator valves $235_{1-N}$, the grease forced out of the grease cylinder 180 will be communicated back to the grease container 125. Alternatively, the return valve 155 could bypass the grease cylinder 180 by communicating grease back to the grease container 125 before the grease passes through the check valve 225.

The volume of grease forced out of the grease cylinder 180 with each stroke of the piston 170 can be determined via measurement or calculation (e.g., by multiplying the cross-sectional area of the rod portion 190 by the length of the piston 170's stroke); as a result, by controlling and/or monitoring the control valve 205, the cycle counter 220, the lubricator valves $235_{1-N}$, the return valve 155, or any combination thereof, the control unit 160 meters a desired amount of grease to each of the process valves $105_1$. In some embodiments, the desired amount of grease metered to each of the process valves $105_1$ can be specifically tailored according to greasing volume and/or frequency guidelines provided, for example, by the manufacturer(s) of the process valves $105_1$ and stored in a database accessible by the control unit 160. In addition, or instead, the desired amount of grease metered to each of the process valves $105_1$ may be provided by a user via a user interface (HMI) connected to the control unit 160; if so desired, the amount of grease metered to each of the process valves $105_1$ can be changed during a job. In addition, by controlling and/or monitoring the fluid transport devices 130 and 145 and the pressure sensors 135 and 150, the control unit 160 regulates the flow of the power fluid and the grease within the system 100.

In some embodiments, the control unit 160 is further adapted to receive data/readings from a pressure sensor 236 (shown in FIG. 3) that detects the pressure of the grease within the grease cylinder 180; by comparing the data/readings obtained from the pressure sensor 236 with data/readings obtained from the pressure sensor 150, the control unit 160 can determine whether the grease cylinder 180 is filled with grease after the piston 170 is stroked in the direction 215. As a result, the control unit 160 can delay stroking the piston in the direction 210 until the grease cylinder 180 is completely filled with grease, thus improving the accuracy of greasing operations. In some embodiments, the control unit 160 controls the metering modules $115_{2-N}$ to deliver and meter grease to the process valves $105_{2-N}$ in substantially the same manner as that described above with respect to the metering module $115_1$ and the valves $105_1$; therefore, the operation of the metering modules $115_{2-N}$ to deliver and meter grease to the process valves $105_{2-N}$ will not be described in further detail. As a result, the control unit 160 is capable of greasing the process valves $105_{1-N}$ at any of the following intervals: timed intervals; continuous greasing (at a rate specified by the user or the database); greasing on command from an operator via a user interface (HMI) at any time; per operational stage (e.g., fracturing stage); per N stages; schedules greasing; scheduled partial greasing; and/or any combination thereof.

In some embodiments, prior to delivering and metering grease to the process valves $105_{1-N}$, the system 100 is capable of verifying that the process valves $105_{1-N}$ are actuated to the proper position for greasing. To achieve such verification, the system 100 includes sensor(s) associated with the process valves $105_{1-N}$ to ensure they are in the proper position prior to greasing. Such sensor(s) may include, for example, position sensor(s) and/or visual feedback devices (e.g., camera(s), image processing software, etc.) capable of detecting the position of the process valves $105_{1-N}$. In addition, the system 100 may include actuator(s) adapted to receive control signals from the control unit 160 to open or close the process valves $105_{1-N}$. As a result, the control unit 160 is able to automatically place the process valves $105_{1-N}$ in the proper greasing position prior to greasing.

Figure 6:
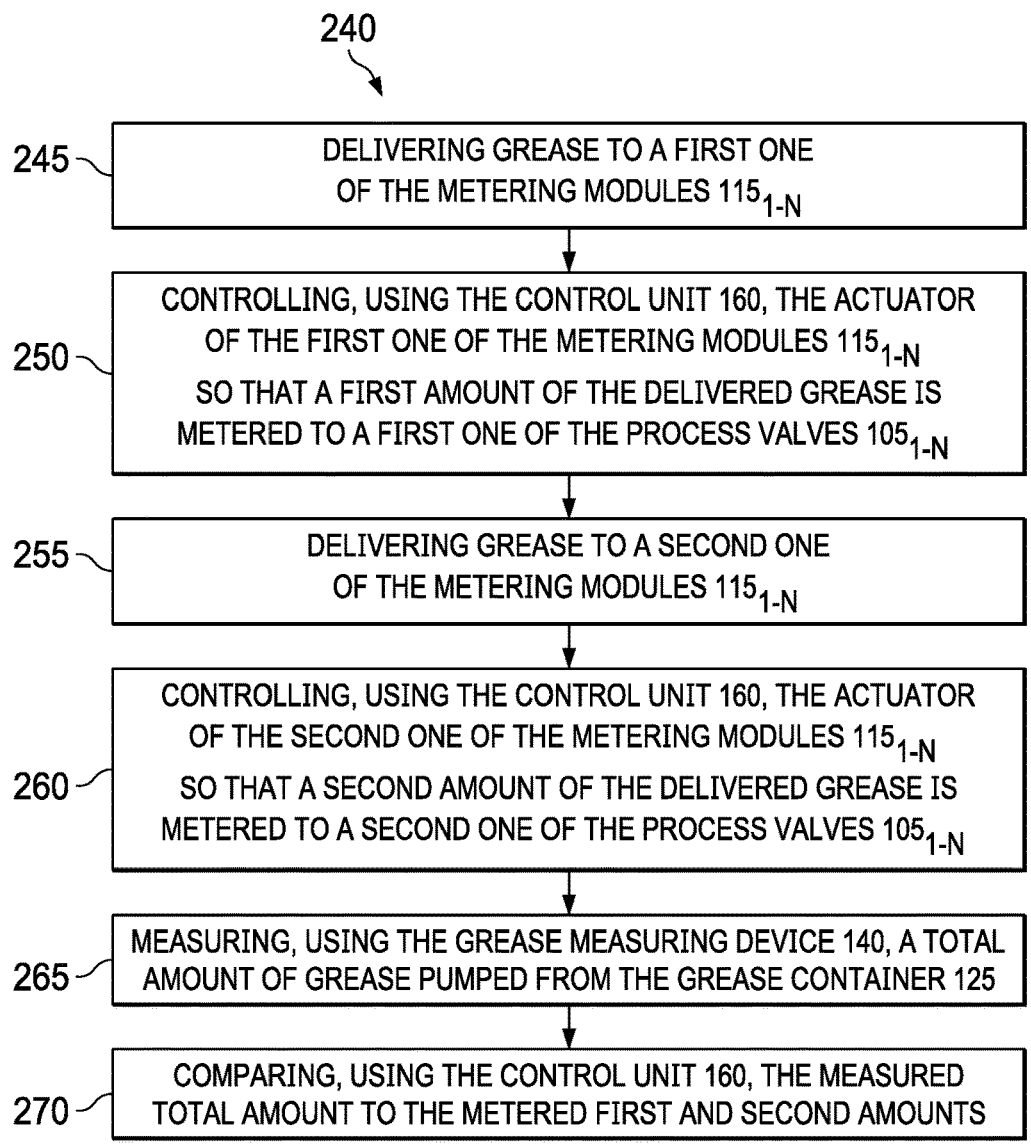
FIG. 6 is a flow diagram of a method for implementing one or more embodiments of the present disclosure.

Referring to FIG. 6, in an embodiment, a method of operating the system 100 is generally referred to by the reference numeral 240. The method 240 is carried out by receiving, at the control unit 160, data/readings from the delivery module 110 (e.g., the pressure sensors 135 and 150) and/or the metering modules $115_{1-N}$(e.g., the cycle counter 220), and sending, from the control unit 160, control signals to the delivery module 110 (e.g., the fluid transport devices 130 and 145, the return valve 155, or any combination thereof) and/or the metering modules $115_{1-N}$(e.g., the control valve 205, the lubricator valves $235_{1-N}$, or any combination thereof).

The method 240 includes at a step 245 delivering grease to a first one of the metering modules $115_{1-N}$. In some embodiments, the step 245 includes transporting the grease from the grease container 125 to the first one of the metering modules $115_{1-N}$. At a step 250, the control unit 160 controls the actuator of the first one of the metering modules $115_{1-N}$ so that a first amount of the delivered grease is metered to a first one of the process valves $105_{1-N}$. In some embodiments, the step 250 includes: controlling the actuator of the first one of the metering modules $115_{1-N}$ to start stroking the piston 170; determining how many strokes of the piston 170 are required to meter the first amount to the first one of the process valves $105_{1-N}$; and controlling the actuator to stop stroking the piston 170 when the strokes counted by the cycle counter 220 equal the determined number of strokes required. In other embodiments, the step 250 includes: controlling the actuator 232c of the first one of the metering modules $115_{1-N}$ to start rotating the rotor 232a; determining how many rotations of the rotor 232a are required to meter the first amount to the first one of the process valves $105_{1-N}$; and controlling the actuator to stop rotating the rotor 232a when the rotations by the cycle counter 220 equal the determined number of rotations required. In some embodiments of the step 250, the control unit 160 determines the first amount by retrieving data relating to the first one of the process valves $105_{1-N}$ from a database.

At a step 255, grease is delivered to a second one of the metering modules $115_{1-N}$. In some embodiments, the step 255 includes transporting the grease from the grease container 125 to the second one of the metering modules $115_{1-N}$. At a step 260, the control unit 160 controls the actuator of the second one of the metering modules $115_{1-N}$ so that a second amount of the delivered grease is metered to a second one of the process valves $105_{1-N}$. In some embodiments of the step 260, the control unit 160 determines the second amount by retrieving data relating to the second one of the process valves $105_{1-N}$ from a database. At a step 265, the grease measuring device 140 measures a total amount of grease transported from the grease container 125. Finally, at a step 270, the control unit 160 compares the measured total amount to the metered first and second amounts.

In some embodiments, among other things, the operation of the system 100 and/or the execution of the method 240: ensures that an appropriate amount of grease is injected into each of the process valves $105_{1-N}$ while monitoring the amount of grease injected into each of the process valves $105_{1-N}$; improves the flushing of debris and contaminants from the process valves $105_{1-N}$; improves the performance of the process valves $105_{1-N}$; decreases the risk that a less than adequate amount of grease is injected into the process valves $105_{1-N}$; decreases the risk of malfunction and maintenance needs for the process valves $105_{1-N}$; and/or reduces operators' exposure to oil and gas process units during operation.

Figure 7:
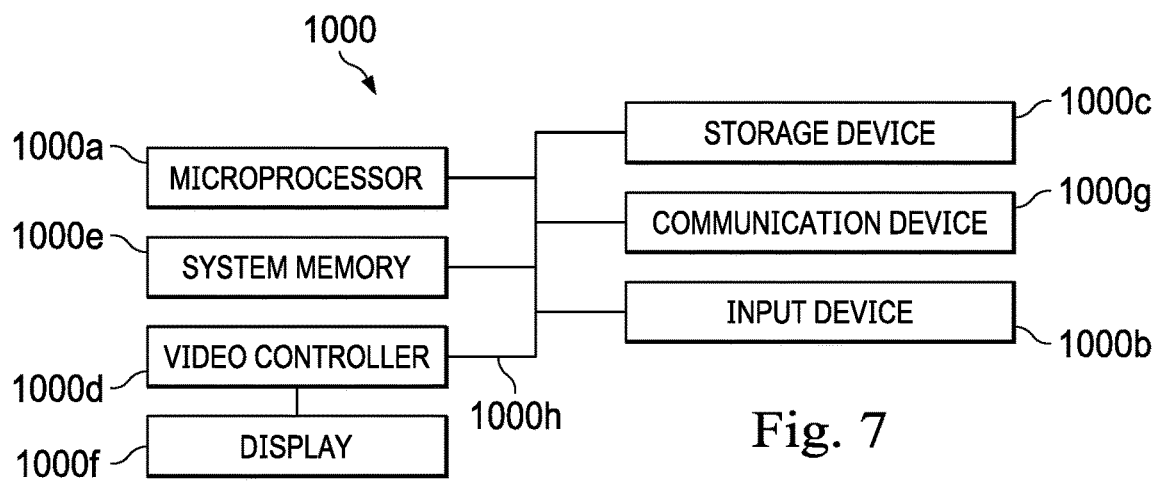
FIG. 7 is a diagrammatic illustration of a computing node for implementing one or more embodiments of the present disclosure.

Referring to FIG. 7, in an embodiment, a computing node 1000 for implementing one or more embodiments of one or more of the above-described elements, control units (e.g., 160), devices (e.g., 140 and/or 165), systems (e.g., 100), methods (e.g., 240) and/or steps (e.g., 245, 250, 255, 260, 265, and/or 270), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet)

computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., 160), devices (e.g., 140 and/or 165), systems (e.g., 100), methods (e.g., 240) and/or steps (e.g., 245,250, 255,260,265, and/or 270), or any combination thereof. In several embodiments, such a processor may include one or more of the microprocessor 1000*a*, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

An apparatus has been disclosed. The apparatus generally includes a first grease metering device to which grease is adapted to be delivered, the first grease metering device including either: a first grease cylinder, a first piston extending at least partially within the first grease cylinder, and a first actuator operably associated with the first piston; or a first casing, a first rotor extending at least partially within the first casing, and a second actuator operably associated with the first rotor; and a control unit adapted to either: control the first actuator to stroke the first piston back and forth within the first grease cylinder so that a first amount of the delivered grease is metered to a first process valve; or control the second actuator to rotate the first rotor within the first casing so that the first amount of the delivered grease is metered to the first process valve.

The foregoing apparatus embodiment may include one or more of the following elements/limitations, either alone or in combination with one another:

The control unit is further adapted to determine the first amount by retrieving data relating to the first process valve from a database.

The first grease metering device further includes a first cycle counter adapted to either: count the strokes of the first piston; or count the rotations of the first rotor.

To meter the first amount to the first process valve, the control unit is further adapted to either: control the first actuator to start stroking the first piston, determine how many strokes of the first piston are required to meter the first amount to the first process valve, and control the first actuator to stop stroking the first piston when the strokes counted by the first cycle counter equal the determined number of strokes required; or control the second actuator to start rotating the first rotor, determine how many rotations of the first rotor are required to meter the first amount to the first process valve, and control the second actuator to stop rotating the first rotor when the rotations counted by the first cycle counter equal the determined number of rotations required.

The apparatus further includes: a grease container from which the grease is adapted to be transported to deliver the grease to the first grease metering device; and a grease measuring device adapted to measure a total amount of grease transported from the grease container; wherein the control unit is further adapted to compare the measured total amount to the metered first amount.

The apparatus further includes: a second grease metering device to which grease is adapted to be delivered, the second grease metering device including either: a second grease cylinder, a second piston extending at least partially within the second grease cylinder, and a third actuator operably associated with the second piston; or a second casing, a second rotor extending at least partially within the second casing, and a fourth actuator operably associated with the second rotor; wherein the control unit is further adapted to either: control the third actuator to stroke the second piston back and forth within the second grease cylinder so that a second amount of the delivered grease is metered to a second process valve; or control the fourth actuator to rotate the second rotor within the second casing so that the second amount of the delivered grease is metered to the second process valve.

The control unit is further adapted to determine the first and second amounts by retrieving data relating to the first and second process valves from a database.

The apparatus further includes: a grease container from which the grease is adapted to be transported to deliver the grease to the first and second grease metering devices; and a grease measuring device adapted to measure a total amount of grease transported from the grease container; wherein the control unit is further adapted to compare the measured total amount to the metered first and second amounts.

A method has also been disclosed. The method generally includes delivering grease to a first grease metering device, the first grease metering device including either: a first grease cylinder, a first piston extending at least partially within the first grease cylinder, and a first actuator operably associated with the first piston; or a first casing, a first rotor extending at least partially within the first casing, and a second actuator operably associated with the first rotor; and controlling, using a control unit, either: the first actuator to stroke the first piston back and forth within the first grease cylinder so that a first amount of the delivered grease is metered to a first process valve; or the second actuator to rotate the first rotor within the first casing so that the first amount of the delivered grease is metered to the first process valve.

The foregoing method embodiment may include one or more of the following elements/limitations, either alone or in combination with one another:

The method further includes determining, using the control unit, the first amount by retrieving data relating to the first process valve from a database.

The first grease metering device further includes a first cycle counter; and the method further includes counting, using the first cycle counter, either: the strokes of the first piston; or the rotations of the first rotor.

Controlling, using the control unit, the first actuator includes: controlling the first actuator to start stroking the first piston; determining how many strokes of the first piston are required to meter the first amount to the first process valve; and controlling the first actuator to stop stroking the first piston when the strokes counted by the first cycle counter equal the determined number of strokes required; and controlling, using the control unit, the second actuator includes: controlling the second actuator to start rotating the first rotor; determining how many rotations of the first rotor are required to meter the first amount to the first process valve; and controlling the second actuator to stop rotating the first rotor when the rotations counted by the first cycle counter equal the determined number of rotations required.

Delivering the grease to the first grease metering device includes transporting the grease from a grease container to the first grease metering device; wherein the method further includes: measuring, using a grease measuring device, a total amount of grease transported from the grease container; and comparing, using the control unit, the measured total amount to the metered first amount.

The method further includes delivering grease to a second grease metering device, the second grease metering device including either: a second grease cylinder, a second piston extending at least partially within the second grease cylinder, and a third actuator operably associated with the second piston; or a second casing, a second rotor extending at least partially within the second casing, and a fourth actuator operably associated with the second rotor; and controlling, using the control unit, either: the third actuator to stroke the second piston back and forth within the second grease cylinder so that a second amount of the delivered grease is metered to a second process valve; or the fourth actuator to rotate the second rotor within the second casing so that the second amount of the delivered grease is metered to the second process valve.

The method further includes determining, using the control unit, the first and second amounts by retrieving data relating to the first and second process valves from a database.

Delivering the grease to the first grease metering device includes transporting the grease from a grease container to the first grease metering device; wherein delivering the grease to the second grease metering device includes transporting the grease from the grease container to the second grease metering device; and wherein the method further includes: measuring, using a grease measuring device, a total amount of grease transported from the grease container; and comparing, using the control unit, the measured total amount to the metered first and second amounts.

A system has also been disclosed. The system generally includes a plurality of metering modules adapted to deliver grease to a corresponding plurality of process valves, each of the metering modules including either: a first grease metering device that includes a grease cylinder, a piston extending at least partially within the grease cylinder, and a first actuator operably associated with the piston; or a second grease metering device that includes a casing, a rotor extending at least partially within the casing, and a second actuator operably associated with the rotor; a delivery module including a grease container and a fluid transport device adapted to deliver grease from the grease container to the respective grease metering modules; and a control unit adapted to control: the first actuator(s) to stroke the piston(s) back and forth within the grease cylinder(s) so that respective amounts of the delivered grease are metered to the process valves; and/or the second actuator(s) to rotate the rotor(s) within the casing(s) so that the respective amounts of the delivered grease are metered to the process valves.

The foregoing system embodiment may include one or more of the following elements/limitations, either alone or in combination with one another:

The control unit is further adapted to determine the respective amounts by retrieving data relating to the process valves from a database.

The delivery module further includes a grease measuring device adapted to measure a total amount of grease transported from the grease container; and the control unit is further adapted to compare the measured total amount to the respective metered amounts.

The first grease metering device further includes a first cycle counter adapted to count the strokes of the piston; the second grease metering device further includes a second cycle counter adapted to count the rotations of the rotor; and, to meter the respective amounts to the process valves, the control unit is further adapted to either: control the first actuator(s) to start stroking the piston(s), determine how many strokes are required for the piston(s) to meter the respective amounts to the process valves, and control the first actuator(s) to stop stroking the piston(s) when the strokes counted by the first cycle counter(s) equal the determined number of strokes required; or control the second actuator(s) to start rotating the rotor(s), determine how many rotations are required for the rotor(s) to meter the respective amounts to the process valves, and control the second actuator(s) to stop rotating the rotor(s) when the rotations counted by the second cycle counter(s) equal the determined number of rotations required.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A system, comprising:
   first and second lubricator valves, actuable to:
      a first configuration in which the first lubricator valve is open and the second lubricator valve is closed; and
      a second configuration in which the first lubricator valve is closed and the second lubricator valve is open;
   a grease cylinder including:
      an inlet via which grease is deliverable into the grease cylinder; and
      an outlet via which grease is communicable to the first and second lubricator valves;
   an inlet valve operably associated with the inlet and adapted to communicate grease to the inlet and to prevent, or at least reduce, backflow of grease out of the inlet through the inlet valve;
   a piston extending at least partially within the grease cylinder; and
   an actuator operably associated with the piston and adapted to stroke the piston:
      back within the grease cylinder to deliver grease, via the inlet valve and the inlet, into the grease cylinder; and
      forth within the grease cylinder to deliver grease, via the outlet, out of the grease cylinder and to:
         a first process valve via the first lubricator valve when the first and second lubricator valves are in the first configuration; and
         a second process valve via the second lubricator valve when the first and second lubricator valves are in the second configuration.

2. The system of claim 1, wherein the actuator comprises a power cylinder within which the piston at least partially extends, the piston comprising a head portion slidably disposed in the power cylinder and dividing the power cylinder into first and second chambers.

3. The system of claim 2, wherein the head portion has a first cross-sectional area, and the piston further includes another portion contacting the grease in the grease cylinder and having a second cross-sectional area, the second cross-sectional area being less than the first cross-sectional area.

4. The system of claim 3, further comprising:
   a control valve operably associated with the power cylinder;
   wherein the control valve:
      strokes the piston back within the grease cylinder by communicating power fluid to the first chamber and, at the same time, communicating power fluid from the second chamber; and strokes the piston forth within the grease cylinder by communicating power fluid to the second chamber and, at the same time communicating power fluid from the first chamber.

5. The system of claim 1, further comprising:
the first process valve;
wherein the first lubricator valve is operably associated with the first process valve.

6. The system of claim 1, further comprising:
the first and second process valves;
wherein the first lubricator valve is operably associated with the first process valve; and
wherein the second lubricator valve is operably associated with the second process valve.

7. The system of claim 1, further comprising:
an outlet valve operably associated with the outlet and adapted to communicate grease from the outlet and to prevent, or at least reduce, backflow of grease through the outlet valve and into the outlet.

8. The system of claim 6, wherein the inlet valve is or includes a first check valve, and the outlet valve is or includes a second check valve.

9. The system of claim 1, further comprising a cycle counter that counts the strokes of the piston.

10. The system of claim 9,
wherein the actuator is further adapted to:
start stroking the piston; and
stop stroking the piston; and
wherein the system further comprises a control unit adapted to:
receive data/signal(s) relating to the strokes counted by the cycle counter; and
cause the actuator to stop stroking the piston when the strokes counted by the cycle counter equal a predetermined number of strokes.

11. A method, comprising:
stroking a piston back within a grease cylinder using an actuator operably associated with the piston, wherein:
the piston extends at least partially within the grease cylinder;
the grease cylinder includes:
an inlet via which grease is deliverable into the grease cylinder; and
an outlet via which grease is communicable to first and second lubricator valves;
the first and second lubricator valves are actuable to:
a first configuration in which the first lubricator valve is open and the second lubricator valve is closed; and
a second configuration in which the first lubricator valve is closed and the second lubricator valve is open;
an inlet valve is operably associated with the inlet, and is adapted to communicate grease to the inlet and to prevent, or at least reduce, backflow of grease out of the inlet through the inlet valve; and
stroking the piston back within the grease cylinder delivers grease, via the inlet valve and the inlet, into the grease cylinder;
stroking the piston forth within the grease cylinder, using the actuator, to deliver grease, via the outlet, out of the grease cylinder and to:
a first process valve via the first lubricator valve when the first and second lubricator valves are in the first configuration; and
a second process valve via the second lubricator valve when the first and second lubricator valves are in the second configuration.

12. The method of claim 11, wherein the actuator comprises a power cylinder within which the piston at least partially extends, the piston comprising a head portion slidably disposed in the power cylinder and dividing the power cylinder into first and second chambers.

13. The method of claim 12, wherein the head portion has a first cross-sectional area, and the piston further includes another portion contacting the grease in the grease cylinder and having a second cross-sectional area, the second cross-sectional area being less than the first cross-sectional area.

14. The method of claim 13,
wherein a control valve is operably associated with the power cylinder; and
wherein the control valve:
strokes the piston back within the grease cylinder by communicating power fluid to the first chamber and, at the same time, communicating power fluid from the second chamber; and
strokes the piston forth within the grease cylinder by communicating power fluid to the second chamber and, at the same time communicating power fluid from the first chamber.

15. The method of claim 11, wherein:
the first lubricator valve is operably associated with the first process valve.

16. The method of claim 15, wherein:
the second lubricator valve is operably associated with the second process valve.

17. The method of claim 11, wherein:
an outlet valve is operably associated with the outlet and adapted to communicate grease from the outlet and to prevent, or at least reduce, backflow of grease through the outlet valve and into the outlet.

18. The method of claim 17, wherein the inlet valve is or includes a first check valve, and the outlet valve is or includes a second check valve.

19. The system of claim 11, further comprising:
counting the strokes of the piston using a cycle counter.

20. The method of claim 19, wherein:
the actuator is further adapted to:
start stroking the piston; and
stop stroking the piston; and
wherein the method further comprises:
receiving, using a control unit, data/signal(s) relating to the strokes counted by the cycle counter; and
causing, using the control unit, the actuator to stop stroking the piston when the strokes counted by the cycle counter equal a predetermined number of strokes.

* * * * *

UNITED STATES PATENT AND TRADEMARK OFFICE
CERTIFICATE OF CORRECTION

PATENT NO. : 11,873,945 B2
APPLICATION NO. : 16/938341
DATED : January 16, 2024
INVENTOR(S) : Ronnie B. Beason and Nicholas J. Cannon Page 1 of 1

It is certified that error appears in the above-identified patent and that said Letters Patent is hereby corrected as shown below:

In the Claims

Column 15, Line 20, in Claim 8 replace "claim 6" with --claim 7--

Signed and Sealed this
Twenty-third Day of July, 2024

Katherine Kelly Vidal
*Director of the United States Patent and Trademark Office*